United States Patent [19]

Gellert

[11] Patent Number: 4,921,708
[45] Date of Patent: May 1, 1990

[54] INJECTION MOLDING NOZZLE HAVING CIRCUMFERENTIALLY SPACED CONDUCTIVE PROBES

[76] Inventor: Jobst U. Gellert, 7A Prince Street, Georgetown, Ontario, Canada, L7G 2X1

[21] Appl. No.: 317,741

[22] Filed: Mar. 1, 1989

[30] Foreign Application Priority Data

Feb. 10, 1989 [CA] Canada ................................. 590793

[51] Int. Cl.⁵ ............................................. B29C 45/20
[52] U.S. Cl. ................................ 425/548; 264/328.15; 425/549; 425/568
[58] Field of Search ............ 264/297.2, 328.8, 328.15; 425/549, 567, 568, 570, 571, 572, 588, 562, 548

[56] References Cited

U.S. PATENT DOCUMENTS

| | | | |
|---|---|---|---|
| 3,568,256 | 3/1971 | Johnson | 425/570 |
| 3,758,252 | 9/1973 | Kohler | 425/570 |
| 4,053,271 | 10/1977 | Gellert | 425/562 |
| 4,094,447 | 6/1978 | Gellert | 425/570 |
| 4,276,014 | 6/1981 | Aoki | 425/570 |
| 4,450,999 | 5/1984 | Gellert | 425/549 |
| 4,663,881 | 5/1987 | Gellert | 425/549 |
| 4,688,622 | 8/1987 | Gellert | 164/61 |
| 4,702,689 | 10/1987 | Schmidt et al. | 425/570 |
| 4,768,283 | 9/1988 | Gellert | 425/549 |
| 4,773,154 | 9/1988 | Gellert | 425/549 |

Primary Examiner—Jay H. Woo
Assistant Examiner—Timothy W. Heitbrink
Attorney, Agent, or Firm—Riches, McKenzie & Herbert

[57] ABSTRACT

An injection molding multi-gate nozzle with a central portion having a central melt bore and a spiral electrical heating element integrally brazed in a channel in its outer surface. The nozzle has a number of elongated conductive probes spaced in a sleeve portion which extends around the central portion adjacent its forward end. Each probe extends in the sleeve portion a predetermined distance rearwardly along the central portion and projects from the sleeve portion a predetermined distance forwardly of the forward end of the central portion. Each conductive probe has a copper inner portion which picks up heat from the adjacent coils of the heating element and carries it forwardly to the projecting forward portion adjacent one of the gates. In addition to providing additional heat, this configuration with the forwardly projecting probes provides the mold with more structural strength and improved cooling.

8 Claims, 3 Drawing Sheets

INJECTION MOLDING NOZZLE HAVING CIRCUMFERENTIALLY SPACED CONDUCTIVE PROBES

BACKGROUND OF THE INVENTION

This invention relates generally to injection molding and more particularly to a heated nozzle for conveying melt from an inlet to a number of spaced gates, each leading to a different cavity.

Heated nozzles for multi-cavity molding such as by edge gating are well known in the industry. For instance, the applicant's U.S. Pat. No. 4,663,811 which issued May 12, 1987 discloses heated nozzles with a variety of different gate configurations, one of which is edge gating. While these previous arrangements are entirely satisfactory for some applications, in other cases they do not provide sufficient heat and/or structural strength or the area adjacent the cavities is too difficult to cool. As is well known, with the continual development of more and more difficult to mold materials it is increasingly important to provide more heat closer to the gate area. There are various arrangements to do this for a single central gate, such as the hop tip seal shown in the applicant's U.S. Pat. No. 4,450,999 which issued May 29, 1984 or the circular heating element porton shown in the applicant's Canadian patent application serial number 578,973 filed Sept. 30, 1988 entitled "Injection Molding Nozzle Having Nose Portion with Heating Element Encircling the Bore and Method". However, it is much more difficult to provide additional heat to the areas of the gate in a configuration where a number of gates are spaced around or along the periphery of the nozzle. Also, with some cavity and gate configurations it is difficult to provide the mold with sufficient strength to withstand the repeated impact of the clamp force and the high injection pressure. In other words, if only a thin portion of the cavity plate is provided between the front end of the nozzle and the parting line, the mold will often eventually fracture resulting in shut down of the system. An early configuration in which a heater cast having spaced nozzle portions for edge gating is disclosed in the applicant's U.S. Pat. No. 4,094,447 which issued June 13, 1978.

SUMMARY OF THE INVENTION

Accordingly, it is an object of the present invention to at least partially overcome the disadvantages of the prior art by providing a nozzle for a multi-gate system which is heated by an integral spiral heating element with a configuration having a plurality of spaced heat conductive probes which extend forwardly to conduct heat adjacent each of the gates.

To this end, in one of its aspects, the invention provides a heated injection molding nozzle to be seated in a well in a cavity place to convey melt from a nozzle inlet to a plurality of spaced gates extending through the cavity plate adjacent the nozzle, the nozzle having a collar portion adjacent a rear end, and a central portion having a forward end and a cylindrical outer surface extending from the collar portion, the nozzle having a central melt bore which extends from the inlet at the rear end to the forward end of the central portion, the nozzle having an electrically insulated heating element with a rear end portion and a spiral portion which is integrally brazed in a channel in the cylindrical outer surface of the central portion of the nozzle, the rear end portion of the heating element extending out through the collar portion to an electrical terminal, the improvement wherein the nozzle has an outer sleeve portion which encircles the cylindrical outer surface of the central portion of the nozzle adjacent the forward end of the central portion, the sleeve portion having a plurality of longitudinal conductive probes spaced therearound, the probes each having a forward portion which extends a predetermined distance forwardly of the forward end of the central portion of the nozzle to provide additional heat to the melt which flows past the forward portion to one of the gates.

Further objects and advantages of the invention will appear from the following description taken together with the accompanying drawings.

DETAILED DESCRIPTION OF THE DRAWINGS

Figure 1:
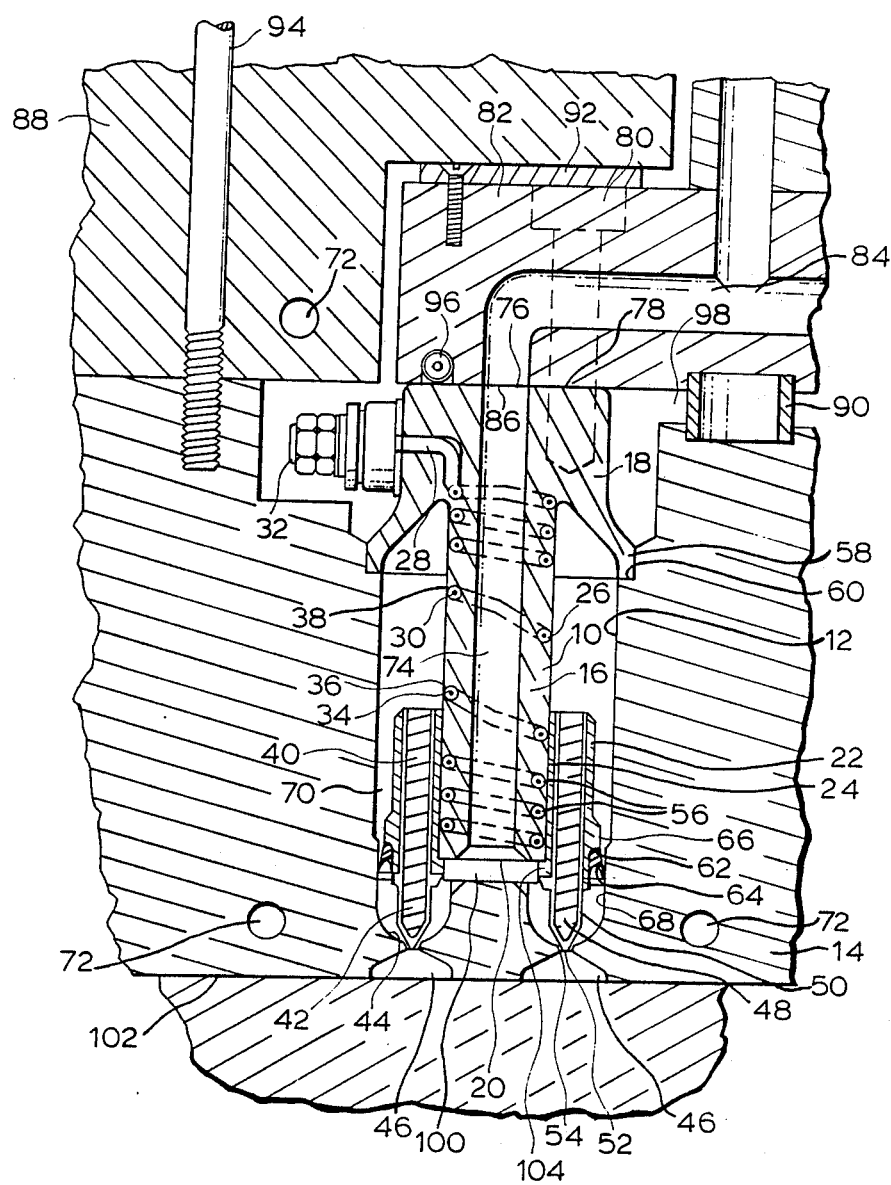
FIG. 1 is a sectional view of a portion of an injection molding system having a nozzle according to one embodiment of the invention.

Reference is first made to FIG. 1 which shows an injection molding system in which a number of nozzles 10 according to the invention are each seated in a well 12 in a cavity plate 14. Each nozzle has a central portion 16 which extends from a collar portion 18 to a forward end 20. An outer sleeve portion 22 encircles the cylindrical outer surface 24 of the central portion 16 adjacent the forward end 20 of the central portion 16. The nozzle 10 is heated by an electrically insulate heating element 26 which has a rear end portion 28 and a spiral portion 30 which is integrally brazed in a channel in the cylindrical outer surface 24 of the central portion 16 of the nozzle 10. The rear end portion 28 of the heating element 26 extends out through the collar portion 18 to an electrical terminal 32. The heating element 26 has a chrome nickel resistance wire 34 extending centrally through a refractory powder electrical insulating material 36 such as magnesium oxide inside a steel casing 38.

The nozzle 10 has a number of elongated conductive probes 40 which are integrally received in the outer sleeve portion 22, each with a forward portion 42 which project forwardly from the sleeve portion 22 a predetermined distance into individual sub-wells 44 in the bottom of the nozzle well 12 in the cavity plate 14. This configuration provides additional distance between the forward end 20 of the central portion 16 and the cavities 46, thus strengthening the mold against the repeated impact of high injection pressure and clamp pressure on the parting line. In this embodiment, the sleeve portion 22 is made of H13 steel and the conductive probes 40 are made with a highly conductive copper portion 48 inside an abrasion and corrosion resistant outer portion 50 made of high speed steel. Also in this embodiment, the forward portions 42 of the conductive probes 40 each have a pointed tip 52 positioned in one of the sub-wells 44 in alignment with one of the gates 54 extending through the cavity plate 14 to a cavity 46. As can be seen, the conductive probes 40 extend rearwardly in the sleeve portion 22 a predetermined distance to pick up heat from the adjacent coils 56 of the heating element 26. The copper portion 48 conducts the heat to the pointed tip 52 adjacent the gate 54.

The nozzle 10 is accurately located in this position by a circumferential insulating flange 58 which extends from the collar portion 18 and sits against a circumferential shoulder 60. Also, a seal 62 having a V-shaped lower surface 64 which sits against a circumferential flange 66 extending outwardly from the sleeve portion 22 abuts against the inner surface 68 of the well 12. Thus, in this position, an insulative air space 70 is provided between the hot nozzle 10 and the surrounding cavity plate 14 with minimum contact between them. The cavity plate 14 is cooled by pumping cooling water through conduits 72. As described in the applicant's U.S. Pat. No. 4,053,271 which issued Oct. 11, 1977, this seal 62 prevents the pressurized melt from filling the insulative air space 70 during use.

The nozzle 10 has a central melt bore 74 which extends from an inlet 76 at the rear end 78 to the forward end 20 of the central portion 16 of the nozzle 10. The nozzles 10 are secured by bolts 80 to a common elongated manifold 82 which has a melt passage 84 which branches to a number of outlets 86, each of which is aligned with the melt bore 74 through one of the nozzles 10. The manifold 82 is located securely in place between a back plate 88 and the cavity plate 14 by a central locating ring 90 and a titanium pressure pad 92. The back plate 88 is held in place by bolts 94 which extend through the back plate 88 into the cavity plate 14. The back plate 88 is also cooled by pumping cooling water through cooling conduits 72. The manifold 82 is heated by an electric heating element 96 which is cast into it as described in the applicant's U.S. Pat. No. 4,688,622 which issued Aug. 25, 1987. The locating ring 90 bridges another insulative air space 98 between the heated manifold 82 and the cavity support 14.

In use, the system is assembled as shown in FIG. 1 and electrical power is applied to the terminal 32 of the heating element 26 of each nozzle 10 and to the heating element 96 in the manifold 82 to heat the nozzles 10 and the manifold 82 to a predetermined operating temperature. Pressurized melt from a molding machine (not shown) is injected into the melt passage 84 through the manifold 82 according to a predetermined cycle in a conventional manner. The pressurized melt flows through the melt bore 74 in each nozzle 10 into the space 100 adjacent the forward end 20 of the central portion 16 of the nozzle, from which it flows outward around the forward portion 42 of each of the conductive probes 40 in the respective sub-wells 44 and through the gates 54 to fill the cavities 46. As mentioned above, the inner copper portion 48 of each of the conductive probes 40 picks up heat from the adjacent coils 56 of the heating element 26 and conducts it to the pointed tip 52 adjacent the gate 54 to provide sufficient heat for clean efficient gating. After the cavities 46 are filled, injection pressure is held momentarily to pack and then released. After a short cooling period, the mold is opened along the parting line 102 to eject the molded products. After ejection the mold is closed and injection pressure is reapplied to refill the cavities 46. This cycle is repeated continuously with a frequency dependent on the size and shape of the cavities and the type of material being molded.

Figure 2:
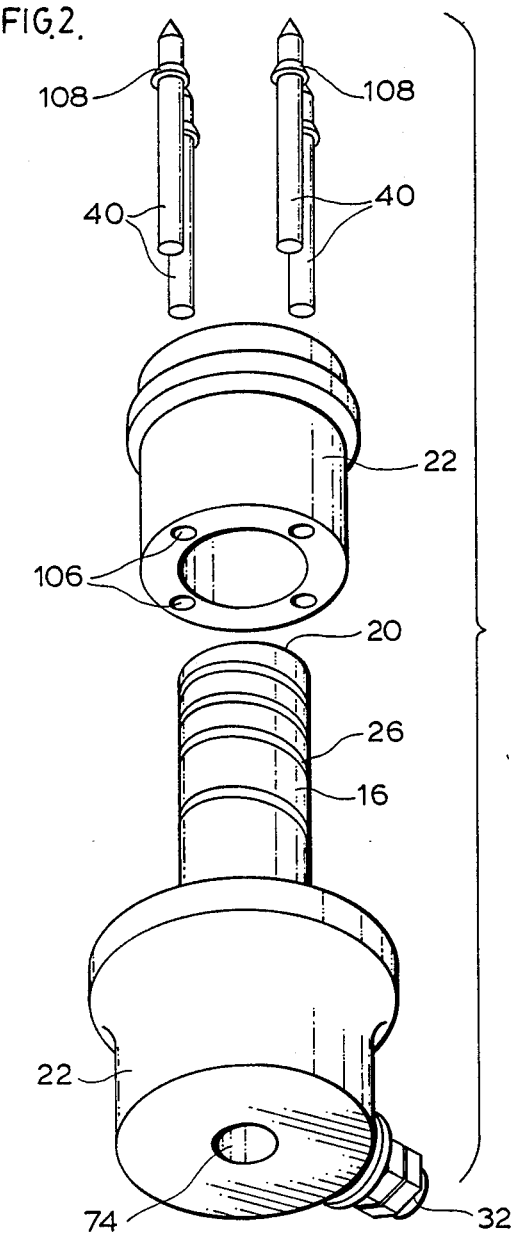
FIG. 2 is an exploded isometric view showing how the components of the nozzle seen in FIG. 1 are assembled.

Reference is now made to FIG. 2 to describe how a nozzle 10 according to the invention is made. Firstly, the heating element 26 is wound on the central portion 16, which is then located in the collar portion 22 with the rear end portion 28 of the heating element extending out to the terminal 32, similar to the method described in the applicant's U.S. Pat. Nos. 4,768,283 which issued Sept. 6, 1988 and 4,773,154 which issued Sept. 27, 1988. The sleeve portion 22 is then placed over the forward end 20 of the upwardly extending forward end 20 of the central portion 16. As seen in FIG. 1, the sleeve portion 22 has an inwardly extending flange 104 which sits against the forward end 20 of the central portion 16 to longitudinally locate it in this position. A conductive probe 40 is then placed in each spaced opening 106 in the sleeve portion 22 where peripheral flanges 108 similarly locate them longitudinally. A nickel alloy brazing material is then applied to the outer surface 24 of the central portion 16 and around the conductive probes 40 before the assembled are heated in batches in a vacuum furnace. In this embodiment, as the furnace is gradually heated to a temperature of approximately 2000° F., the furnace is evacuated to a relatively high vacuum to remove nearly all the oxygen. Before the melting point to the nickel alloy is reached, the vacuum is reduced by partially backfilling the furnace with an inert gas such as nitrogen. When the nickel alloy melts, it flows by capillary action around the heating element 26 to fill the spiral channel in the outer surface 24 and integrally embed the heating element 26. The molten nickel alloy also flows between the central portion 16 and the collar portion 18, between the central portion 16 and the sleeve portion 22, and between the sleeve portion 22 and the conductive probes 40 to integrally bond them together. Brazing in a vacuum furnace provides a metallurgical bonding of the components which improves the efficiency of heat transfer from the coils 56 of the heating element 26 to the conductive probes 40. After the nozzles 10 are cooled and removed from the vacuum furnance they are machined to remove any excess material such as the projecting portions of the flanges 108.

Figure 3:
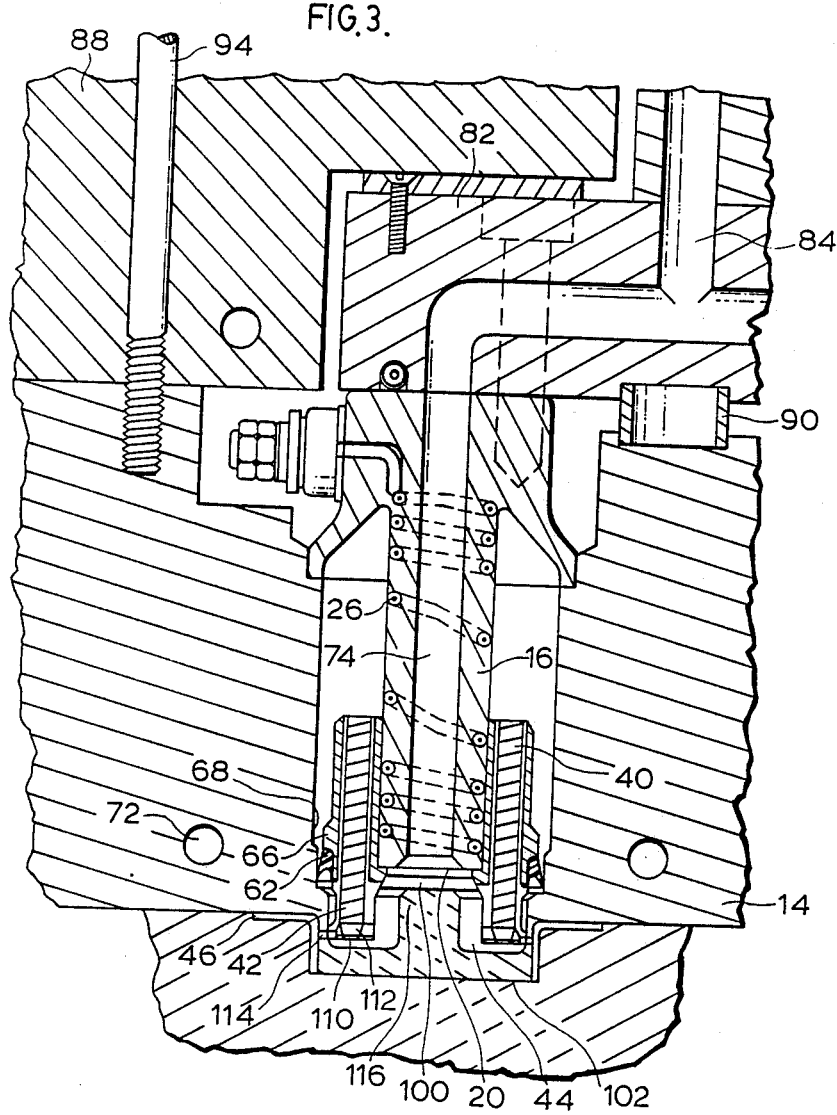
FIG. 3 is another sectional view showing a nozzle according to another embodiment of the invention.

Reference is now made to another embodiment of the invention as shown in FIG. 3. As most of the elements of this embodiment are identical to those of the first embodiment, elements common to both embodiments are described and illustrated using the same reference numbers. In this embodiment, the forward portion 42 of the conductive probes 40 have a different shape to provide for hot edge gating rather than hot tip gating. As can be seen, the forward end 110 of each probe has a diametrical channel 112 to convey melt from the space 100 adjacent the forward end 20 of the central portion 16 of the nozzle 10 to the respective edge gate 114. While a layer of melt solidifies where it contacts the cooled cavity plate, the conductive probes 40 provides sufficient heat to the melt adjacent the forward end 20 and in the channel 112 to prevent it solidifying. As mentioned above, this arrangement of having the conductive probes 40 extend a predetermined distance forwardly into the sub-wells 44 forms the raised central portion 116 of the cavity plate 14 which provides additional strength and allows the thickness of the cavity plate 14 between the bottom of the sub-wells 44 and the parting line 102 to be less for any given application. This is particularly important for edge gating low height products. Other than the shape of the forward ends 20 of the conductive probes 40, the elements of this embodiment are the same as the first embodiment and the description of them and their use need not be repeated.

While a description of the nozzles have been given with respect to particular embodiments, it is not to be construed in a limiting sense. Variations and modifications will occur to those skilled in the art. For instance, the nozzles can have a different number of conductive probes 40 for different gate configurations and the components can be made of other suitable materials with different shapes and dimensions. Reference is made to the appended claims for a definition of the invention.

What I claim is:

1. In a heated injection molding nozzle to be seated in a well in a cavity plate to convey melt through the nozzle from a nozzle inlet towards a plurality of spaced gates extending through the cavity plate adjacent the nozzle, the nozzle having a central portion, a rear end and a collar portion adjacent the rear end, the central portion having a forward end and a cylindrical outer surface extending from the collar portion, the nozzle having a central melt bore which extends from the inlet at the rear end to the forward end of the central portion, the nozzle having an electrically insulated heating element with a rear end portion and a spiral portion which is integrally brazed in a channel in the cylindrical outer surface of the central portion of the nozzle, the rear end portion of the heating element extending out through the collar portion to an electrical terminal, the improvement wherein;

the nozzle has an outer sleeve portion which encircles the cylindrical outer surface of the central portion of the nozzle adjacent the forward end of the central portion, the sleeve portion having a plurality of longitudinal conductive probes spaced around the sleeve portion, the probes each having a forward portion which extends a predetermined distance forwardly of the forward end of the central portion of the nozzle to provide additional heat to the melt which flows past the forward portion to one of the gates.

2. An injection molding nozzle as claimed in claim 1 wherein the sleeve portion is integrally fused to the outer surface of the central portion of the nozzle and extends a predetermined distance rearwardly of the forward end of the central portion.

3. An injection molding nozzle as claimed in claim 2 wherein the conductive probes are integrally received in the sleeve portion to extend a predetermined distance rearwardly of the forward end of the central portion of the nozzle and to project a predetermined distance forwardly past the forward end of the central portion.

4. An injection molding nozzle as claimed in claim 3 wherein each conductive probe has a conductive inner portion and at least the forward portion has an abrasion and corrosion resistant outer portion.

5. An injection molding nozzle as claimed in claim 4 wherein the inner portion of each probe is made of copper and the outer portion of each probe is made of high speed steel.

6. An injection molding nozzle as claimed in claim 5 wherein the outer sleeve portion has an outwardly extending circumferential flange to receive a seal.

7. An injection molding nozzle as claimed in claim 4 wherein the forward portion of each conductive probe has a pointed tip which extends in alignment with one of the gates through the cavity plate.

8. An injection molding nozzle as claimed in claim 4 wherein each conductive probe has a forward end with a channel extending diametrically thereacross to convey melt to an edge gate through the cavity plate.

* * * * *